United States Patent [19]

Ritz et al.

[11] 4,072,642
[45] Feb. 7, 1978

[54] ALKYD RESINS

[75] Inventors: Jürgen Ritz, Mainz-Mombach; Rolf Zimmermann, Wiesbaden; Hannes Fischer, Taunusstein, Wehen, all of Germany

[73] Assignee: Hoechst Aktiengesellschaft, Frankfurt, Germany

[21] Appl. No.: 609,709

[22] Filed: Sept. 2, 1975

[30] Foreign Application Priority Data

Sept. 2, 1974 Germany .......................... 2441922

[51] Int. Cl.$^2$ .................. C08G 63/20; C08G 63/48; C08G 63/52
[52] U.S. Cl. ........................ 260/22 CB; 260/22 T; 260/22 R; 260/75 T; 260/75 A; 260/76; 428/482
[58] Field of Search ............... 260/22 T, 22 CB, 75 T, 260/75 A, 76

[56] References Cited

U.S. PATENT DOCUMENTS

| | | | |
|---|---|---|---|
| 3,312,644 | 4/1967 | Miyairi et al. | 260/22 CB |
| 3,340,327 | 9/1967 | Spellberg et al. | 260/75 A X |
| 3,347,806 | 10/1967 | Zimmermann | 260/22 CB |
| 3,441,632 | 4/1969 | Tanaka et al. | 260/75 T X |
| 3,448,066 | 6/1969 | Parker | 260/75 A X |

FOREIGN PATENT DOCUMENTS 241,121  7/1965  Austria.

Primary Examiner—Lester L. Lee
Assistant Examiner—W. C. Danison, Jr.
Attorney, Agent, or Firm—Littlepage, Quaintance, Murphy, Richardson & Webner

[57] ABSTRACT

An air-drying alkyd resin comprising (I) at least one α,β-olefinically unsaturated dicarboxylic acid unit or a mixture thereof with (I') a polycarboxylic acid unit being free from polymerizable olefinic and acetylenic bonds, said units bound as an ester, (II) at least one trihydric alcohol unit or a combination thereof with a minor amount of a dihydric alcohol unit, (III) from 10 to 35% by weight (referred to the total alkyd resin) of cyclopentadiene units and (IV) at least one predominantly aliphatic monocarboxylic acid unit, wherein the amount by weight of monocarboxylic acid units is at least as large as the total amount of polycarboxylic acid units, the latter being calculated as anhydride and a process of preparation said resin.

11 Claims, No Drawings

ALKYD RESINS

This invention relates to air-drying, fatty acid modified alkyd resins and a process for preparing them.

Dicyclopentadiene has been used as a raw material for the preparation of synthetic resins. Its various possible reactions can then be used in different ways, for example, it can be split up into two molecules of cyclopentadiene (hereinafter referred to as monomerisation) and in this form take part in a number of diene syntheses. Thus it can be reacted with dienophiles of the maleic anhydride type. The endomethylenetetrahydrophthalic anhydride thus formed is suitable as a chain-lengthening component in polycondensations. Similarly cyclopentadiene may be reacted with polyesters containing maleic acid units. Cyclopentadiene may also be added to natural oils or to the isomerised fatty acids thereof which contain conjugated double bonds, e.g. it may be added to oils of the dehydrated castor oil type, and may be used, in this form, as a modifying component of polyester resins containing fatty acids.

It has been proposed to add polar group containing compounds, for example alcohols or carboxylic acids, to the double bond of the bicycloheptene ring of dicyclopentadiene. It is important however that the temperature does not rise above about 160° C, as otherwise monomerisation of the dicylopentadiene occurs and secondary reactions of the cyclopentadiene formed may ensue.

There have also been a number of publications which describe the preparation of unsaturated polyester resins, wherein dicyclopentadiene is incorporated by means of one or more of the above-mentioned reactions into the unsaturated polyester resins. The resins thereby produced can be hardened in the presence of suitable monomers in conventional manner for unsaturated polyester resins, e.g. by means of free radicals.

The preparation of unsaturated polyester resins modified with dicyclopentadiene, has already been described, said polyester resins being also modified by minor quantities of saturated or unsaturated monocarboxylic acids, for example benzoic acid and drying, half-drying and non-drying fatty acids, or by a minor quantity of an ester formed from a fatty acid and a polyhydric alcohol. The term "minor quantity" is defined as 0.5 to 20% by weight, based on the weight of the polycarboxylic acid component. Such polyesters are generally prepared in a two step process, for example a mixture of one mol of an $\alpha,\beta$-olefinically unsaturated polycarboxylic acid component, maleic anhydride, of which up to 50 equivalent % may be replaced by other polycarboxylic acids which contain no acetylenic or olefinic bonds or by the anhydrides thereof, is heated with an excess of a polyhydric alcohol and dicyclopentadiene at a temperature below 142° C. Subsequently, the mixture is heated at a temperature above 160° C until the esterification reaction is complete. The product is then polymerised with suitable monomers.

According to the present invention there is now provided a multi-stage process for the preparation of an air-drying, fatty acid modified alkyd resin which comprises reacting (I) at least one $\alpha,\beta$-olefinically unsaturated dicarboxylic acid component alone or together with (I') a polycarboxylic acid component being free from polymerisable olefinic and acetylenic bonds, (II) at least one trihydric alcohol and (III) dicyclopentadiene at a temperature up to 160° C and subsequently reacting the product formed with (IV) at least one predominantly aliphatic monocarboxylic component at a temperature of at least 160° C whereby an alkyd resin containing from 10 to 35% by weight of cyclopentadiene units (as herein defined) and containing an amount by weight of monocarboxylic acid units as least as large as the total amount of the polycarboxylic component, the latter being calculated as anhydride, is obtained.

In addition unreacted dicyclopentadiene (III) from the first stage and/or its splitting product cyclopentadiene and/or further amounts of components (I) and/or (I') may also be reacted in the second stage.

According to a further feature of the invention there is provided an air-drying alkyd resin comprising (I) at least one $\alpha,\beta$-olefinically unsaturated dicarboxylic acid unit bound as an ester, (II) at least one trihydric alcohol unit, (III) from 10 to 35% by weight (referred to the total alkyd resin) of cyclopentadiene units and (IV) at least one predominantly aliphatic monocarboxylic acid unit, wherein the amount by weight of monocarboxylic acid units is at least as large as the total amount of polycarboxylic acid units, the latter being calculated as anhydride.

The resin may if desired additionally contain at least one polycarboxylic acid unit being free from polymerisable ethyleni or acetylenic bonds.

The term "cyclopentadiene units" used herein means structural units which originate from cyclopentadiene and/or dicyclopentadiene. Of course, only the structure of the cyclopentadiene units remains and some of the double bonds disappear during the reaction and coating process. The requirement that the final resin contains from 10 to 35% by weight of cyclopentadiene units is satisfied by the maintenance of a temperature of not more than 160° C in the first step, since at this temperature, the undesirable splitting of the dicyclopentådiene is largely suppressed. Consequently, the proportion of incorporated cyclopentadiene rings which are incorporated as such and not in the form of dicyclopentadiene rings is only small. In the resins obtained according to the invention, it is generally at most 35% by weight of the total quantity of cyclopentadiene incorporated.

The terms "monocarboxylic acid component", "dicarboxylic acid component" and "polycarboxylic acid component" used herein include both the free acids and their suitable derivatives. With regard to the di- and polycarboxylic acid component the use of the anhydrides is preferred, while the monocarboxylic acid component may be used in the form of the esters.

The terms "monocarboxylic acid unit", "dicarboxylic acid unit" and polycarboxylic acid unit" used herein mean structural units not necessarily being in the form of the free acid or anhydride but rather being bound as an ester. The term "polycarboxylic acids" does always mean acids having at least two carboxylic groups.

The first reaction step is generally effected at 120 to 160° C, preferably 145° to 160° C, and the second step at 180° to 250° C, preferably 190° to 220° C. However, in certain cases, depending on the pressure applied, it is possible to work outside these temperature ranges.

In the second reaction step, the esterification is preferably continued until the acid number of the product is less than 20. This two stage process has the advantage particularly when using anhydrides that, in the first step, partial esters, preferably half esters, are formed by reaction of the polycarboxylic acid components with the alcohols, and these esters then react further in the second step with elongation of the chain.

The α,β-olefinically unsaturated dicarboxylic acid component (I) contains the usual components vis. itaconic acid, citraconic acid, mesaconic acid and fumaric acid or their derivatives, preferably maleic anhydride or mixtures thereof.

The polycarboxylic acid component (I') may be reacted in an amount up to 80mol% in exceptional cases but more usually in an amount up to 50mol% (based on the total di- and higher polycarboxylic acid components (I and I'). Preferred polycaboxylic acids include those which form internal anhydrides, e.g. phthalic anhydride, tetrahydrophthalic anhydride, trimellitic anhydride, pyromellitic anhydride and endomethylenetetrahydrophthalic anhydride, and are preferably reacted as anhydride since ester formation then proceeds more smoothly and the reaction is therefore easier to control. The polycarboxylic acid component (I') may comprise one or a mixture of acids or anhydrides.

Preferred trihydric alcohols (II) include those conventionally used to prepare alkyd resins, e.g. glycerol, trimethylolethane, trimethylolpropane, di-(trimethylolpropane), pentaerythritol, dipentaerythritol and sorbitol, and these may be reacted either alone or in admixture. If desired, a minor amount of diols, e.g. ethylene glycol, propylene glycol, butylene glycol-1-3, diethylene glycol and neopentyl glycol, may also additionally be reacted in the first step but preferably only is amounts up to 20, preferably up to 10 mol% of the total alcohol component.

The aliphatic monocarboxylic acid component (IV) preferably contains at least one natural unsaturated fatty acid, e.g. the fatty acids from soya bean oil, linseed oil, cottonseed oil, tobacco seed oil, fish oil, dehydrated castor oil, safflower oil, sunflower oil, poppy-seed oil, tall oil and wood oil, and the pure oils themselves, either in the form of the free acid or a glyceride ester. Modified fatty acids derived from the oils mentioned above, e.g. the isomerised fatty acids containing conjugated double bonds may also be used.

Dicyclopentadiene not incorporated into the polyester in the first step, may be added in a subsequent step to the unsaturated dicarboxylic acid anhydride, preferably maleic anhydride at a temperature higher than that of the first step, in the form of the monomer cyclopentadiene.

In the second reaction step, further carboxylic acid components may be included, for example aromatic mono- and dicarboxylic acids including their substitution products, (e.g. benzoic acid, p-tert. butyl-benzoic acid, phthalic acid, isophthalic acid and terephthalic acid), and aliphatic saturated and unsaturated dicarboxylic acids, (e.g. adipic acid, fumaric acid and maleic acid) and their anhydrides, if they exist. The further additives have a favourable effect on the gloss of coatings prepared from the alkyd resin products according to the invention.

The incorporation of cyclopentadiene compounds in the second step may advantageously be carried out in the presence of catalysts, e.g. triphenyl phosphite, bicyclic phosphites, organotin compounds, for example dibutyl-tin compounds (e.g. dibutyl-tin oxide), isomerised fatty acids and metal salts, oxides and hydroxides (e.g. calcium acetate, lead oxide and lithium hydroxide). These catalysts are generally used in a quantity of up to 0.2% by weight of the total mixture.

The reaction is preferably effected in the presence of an entrainer which removes water formed during the reaction, for example xylene.

The relative amounts of the individual components may be varied within broad limits. The molar ratio of the polyhydric alcohols (II) used to the polycarboxylic acid components (I and I') used in the first reaction step is generally from 0.3 : 1 to 5 : 1 preferably 0.6 : 1 to 2.5 : 1 and the molar ratio of polycarboxylic acid components (I and I') to dicyclopentadiene (III) is generally from 5:1 to 1 : 1.3. If the dicyclopentadiene is used in a molar excess, it is advisable to ensure that enough dienophile, e.g. maleic anhydride, is present in the second step to bind the dicyclopentadiene not incorporated in the first reaction step in the form of its monomer cyclopentadiene as a Diels-Alder adduct.

The amount of dicyclopentadiene incorporated into the final product is generally from 10 to 35% by weight of the total mixture. The quantity of free fatty acids or fatty acid derivatives added is generally up to 60, preferably from 20 to 60% by weight of the total mixture, and the quantity of aromatic mono- and/or dicarboxylic acids or aliphatic dicarboxylic acids incorporated as free acids or derivatives in the second step is from 3 to 15% by weight of the total mixture.

The products according to the invention may be dissolved in solvents which are conventionally used for processing air-drying fatty-acid-modified alkyd resins. Suitable solvents include for example aliphatic and aromatic solvents, particularly petroleum fractions with various boiling ranges, toluene, xylenes, esters and ketones.

The products according to the invention usually have very low iodine colour numbers, generally up to 15 but preferably up to 8. In general they are substantially lighter in colour than the alkyd resins previously known.

The alkyd resin products according to the invention find their major application in the production of coating compositions, e.g. air-drying lacquers. These lacquers have in general a number of outstanding properties. They can generally be stored for long periods. Organic and inorganic pigments may be incorporated therein and the resin binds these pigments so strongly that they do not normally show a tendency to separate out. The lacquers also generally have very good drying characteristics; drying begins surprisingly quickly and proceeds very rapidly to completion. The lacquers generally also have good flow properties which are much superior to those alkyd resins with the same oil length produced according to conventional methods. The coatings produced generally have a smooth surface of high gloss, being substantially unaffected by storage at elevated temperature.

If desired the alkyd resin products of the second stage of the process may be further modified. Products with hydroxyl numbers of up to 120 may, for example, be reacted with polyisocyanates or melamine resins. For the reaction with isocyanates, products with a hydroxyl number of at least 50 are generally used, whereas, for the reaction with melamine resin, the hydroxyl number may be lower. By means of these reactions, particularly the reaction with a melamine resin, the products obtained in the second step are cross-linked and thus hardened.

The following Examples serve to illustrate the preparation of alkyd resins according to the invention. In the Examples, parts indicates parts by weight. The acid number was in each case determined according to DIN 53 183, the baking residue according to DIN 53 182, the viscosity in an Ubbelohde viscosimeter and the iodide colour number according to DIN 6162.

EXAMPLE 1

In a glass flask fitted with stirrer, reflux cooler and water separator, 239 parts of glycerol, 88 parts of pentaerythritol and 294 parts of maleic anhydride are heated at 120° C for 30 minutes with constant stirring and under a protective gas atmosphere (nitrogen or carbon dioxide). 396 parts of dicyclopentadiene are then added and the mixture is refluxed at 150° C for about 2 hours until the acid number of the mixture has a value from 10 to 15. 428 parts of a distilled cottonseed oil fatty acid and 60 parts of xylene are then added and the mixture is heated at 200° C with constant removal of the water formed during the reaction, and with recycling of the retarder until the acid number of a sample taken has a value of less than 15. After cooling to 130° C, the product is diluted with 1050 parts of white spirit (boiling range 135° to 180° C) and 95 parts of xylene. A very light-coloured alkyd resin solution with the following characteristics is obtained: baking residue 55%, acid number (100%) 12.3, viscosity (diluted to 50% with white spirit) 123 P, iodine number 3.

EXAMPLE 2

294 parts of maleic anhydride, 239 parts of glycerol, 88 parts of pentaerythritol and 396 parts of dicyclopentadiene are reacted together at 150° C as in Example 1. After the addition of 428 parts of a conjugated soya bean oil fatty acid and 60 parts of xylene, further condensation takes place at 190° C until the acid number of a sample taken has a value of less than 20. The product obtained is dissolved in 1140 parts of a mixture of white spirit (boiling range 135° to 180° C) and xylene (15 : 1). The alkyd resin solution obtained has the following characteristics: baking residue 55%, acid number (100%) 19, viscosity (diluted to 50% with white spirit) 270 P, iodine number 3.

EXAMPLE 3

294 parts of maleic anhydride are reacted at 150° C with 348 parts of trimethylolpropane, 88 parts of pentaerythritol and 396 parts of dicyclopentadiene analogously to Example 1. After the addition of 428 parts of a distilled cottonseed oil fatty acid and 60 parts of xylene, further condensation takes place at 190° to 200° C, until the acid number of a sample taken has a value of less than 12. The product is then dissolved in 1200 parts of a mixture of white spirit (boiling range 135° to 180° C) and xylene (13 : 1). The alkyd resin solution obtained has the following characteristics: baking residue 55%, acid number (100%) 8, viscosity (diluted to 50% with white spirit) 98 P, iodine number 3.

EXAMPLE 4

196 parts of maleic anhydride are reacted at 140° C with 239 parts of glycerol, 88 parts of pentaerythritol and 264 parts of dicyclopentadiene analogously to Example 1. After the addition of 200 parts of soya bean oil fatty acid, 228 parts of linseed oil fatty acid, 60 parts of xylene and 148 parts of phthalic anhydride, further polycondensation takes place at 190° C until an acid number of less than 12 is reached. The product is then dissolved in 1000 parts of a mixture of white spirit (boiling range 135° to 180° C) and xylene (11 : 1). The alkyd resin solution obtained has the following characteristics: baking residue 55%, acid number (100%) 10, viscosity (diluted to 50% with white spirit) 275 P, iodine number 3.

EXAMPLE 5

294 parts of maleic anhydride are reacted at 150° C with 475 parts of trimethylolpropane and 396 parts of dicyclopentadiene analogously to Example 1. After the addition of 124 parts of benzoic acid and 221 parts of soya bean oil fatty acid, the mixture is polycondensed at 210° C until an acid number of 15 is reached. The product is dissolved in 715 parts of a mixture of white spirit (boiling range 145° to 200° C) and xylene (1 : 2). The alkyd resin solution obtained has the following characteristics: baking residue 67%, acid number (100%) 13, viscosity [diluted to 50% with white spirit (145/200)/xylene (1 : 2)] 6.8 P, iodine number 5.

EXAMPLE 6

294 parts of maleic anhydride are reacted at 150° C with 223 parts of glycerol, 88 parts of pentaerythritol and 396 parts of dicyclopentadiene analogously to Example 1. After the addition of 280 parts of soya bean oil fatty acid, 150 parts of soya bean oil and 60 parts of xylene, polycondensation is carried out at 195° C until an acid number of less than 20 is reached. The product is dissolved in 1100 parts of a mixture of white spirit (boiling range 135° to 180° C) and xylene (12 : 1). The alkyd resin solution obtained has the following characteristics: baking residue 55%, acid number (100%) 17, viscosity (diluted to 50% with the white spirit (135/180)/xylene solvent mixture) 570 P, iodine number 3.

EXAMPLE 7

247 parts of maleic anhydride and 74 parts of phthalic anhydride are reacted at 150° C with 88 parts of pentaerythritol, 239 parts of glycerol and 325 parts of dicyclopentadiene analogously to Example 1. After the addition of 428 parts of distilled cottonseed oil fatty acid and 60 parts of xylene, the mixture is polycondensed at 200° C until an acid number of 11 is reached. The product is dissolved in 1050 parts of a mixture of white spirit (boiling range 135° to 180° C) and xylene (43 : 7). The alkyd resin solution obtained has the following characteristics: baking residue 55%, acid number (100%) 10, viscosity [diluted to 50% with white spirit 135/180 and xylene (43 : 7)] 299 P, iodine number 3.

TECHNICAL LACQUER TESTS

White coating compositions were produced from the products of Examples 1 to 7 as described hereinafter and their coating properties were tested on glass plates with air drying. 180 parts of 55% solutions of the resins of Examples 1 to 7 are mixed with 70 parts of titanium dioxide (® Kronos RN 59), 2.5 parts of a 4% solution of calcium octoate in petrol, 5 parts of xylene and 9.5 parts of white spirit (boiling range 145° to 200° C) in a bead mill at 1500 r.p.m. at 55° C for 15 minutes. The mixture is allowed to stand for 24 hours at room temperature and 0.667 g of cobalt octoate and 0.834 g of lead octoate in dissolved form and 1.5 g of a skin inhibitor containing oxime are then added. After vigorous stirring, the lacquer is diluted with a mixture of white spirit (boiling range 145° to 200° C) and xylene (2 : 1) in a DIN 4 beaker, to an outflow time of 110 sec. The compositions are applied to glass plates using a 100μ triangle (i.e. an uptake triangle with a slot for applying a coating with a layer thickness of 100μ). The results of the test on these coating compositions are given in Table 1. (B) Red coating compositions were prepared from the products of Examples 2, 3, 5 and 6 as described hereinafter and their coating properties were tested on glass plates with air drying. 180 parts of 55% solutions of the resins of Examples 2, 3, 5 and 6 were mixed with 15 parts of ®Permanent Red HFG (C.I. Pigment orange 38) and 5 parts of a 4% solution of calcium octoate in petrol for 15 minutes at 1500 r.p.m. at 55° C in an attritor 1. The mixture was allowed to stand at room temperature for 24 hours and then 0.667 parts of cobalt octoate and 1.5 parts of lead octoate, both in dissolved form, and 2 parts of skin inhibitor were added. After vigorous stirring, the composition was adjusted to an outflow time of 120 sec. in a DIN 4 beaker, using a mixture of white spirit (145/200° C) and xylene (2 : 1), and was applied to glass plates with a 100μ triangle. The test results are given in Table 2.

In the Tables, non-adhesion beads = the drying time after which small glass beads sprinkled on the lacquer film no longer adhere and may be removed by tapping. Non-adhesion pressure = the drying time after which, when the lacquer films are tested by pressure of the thumb, no adhesion can be detected. Pendulum hardness: measured with the pendulum hardness apparatus according to König (see "Farbe und Lack" 59 (1953) 435). Gloss: measured with an electrical gloss-measuring apparatus according to Lange, irradiation angle 45° C.

Table 1

| | Drying characteristics of the white coating compositions A) | | | | | |
|---|---|---|---|---|---|---|
| Resin from | Non-adhesion | | Gloss | | Pendulum hardness (sec) | |
| Example | Beads after | Pressure after | after 24h | after 24h at 100° C | after 24h | after 24h at 100° C |
| 1 | 1 h 45 m | 5 h | 100 | 93 | 13 | 140 |
| 2 | 1 h 30 m | 5 h | 106 | 96 | 18 | 178 |
| 3 | 1 h 15 m | 4 h | 108 | 96 | 14 | 165 |
| 4 | 2 h 50 m | 5 h | 110 | 97 | 13 | 170 |
| 5 | 18 m | 5 h | 106 | 96 | 12 | 175 |
| 6 | 3 h | 6 h 20 m | 110 | 97 | 16 | 173 |
| 7 | 1 h 50 m | 5 h | 107 | 97 | 15 | 160 |

Table 2

| | Drying characteristics of the red coating compositions B) | | | | | |
|---|---|---|---|---|---|---|
| Resin from | Non-adhesion | | Gloss (%) | | Pendulum hardness (sec) | |
| Example | Beads after | Pressure after | after 24h | after 24h at 100° C | after 24h | after 24h at 100° C |
| 2 | 1 h 45 m | 5 h 45 m | 112 | 100 | 27 | 180 |
| 3 | 1 h 50 m | 4 h 15 m | 105 | 93 | 18 | 176 |
| 5 | 3 h | 5 h | 110 | 102 | 16 | 167 |
| 6 | 2 h 45 m | 5 h 25 m | 110 | 99 | 20 | 180 |

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A multi-stage process for the preparation of a fatty acid modified alkyd resin which is capable of air-drying in the absence of a peroxide which comprises first forming a reaction product by reacting in a first step A only
   (I) at least one α,β-olefinically unsaturated dicarboxylic acid component or a mixture thereof with
   (I') a polycarboxylic acid component being free from polymerisable olefinic and acetylenic bonds, the mol percent of (I) being up to 50% of (I) + (I'),
   (II) at least one trihydric alcohol or a mixture thereof with a minor amount of a dihydric alcohol and
   (III) dicyclopentadiene at a temperature up to 160° C and subsequently in a second step B adding to the product formed in A
   (IV) at least one aliphatic monocarboxylic acid component selected from the group consisting of an unsaturated fatty acid and its esters, and further esterifying and modifying A with (IV) at a temperature of at least 160° C to yield an alkyd resin containing from (1) 10 to 35% by weight of cyclopentadiene units and wherein (2) the amount by weight of the aliphatic monocarboxylic acid components added is between 20 and 60% by weight of the total reaction mixture, but at least as large as the total amount of the polycarboxylic acid component, the latter being calculated as anhyride.

2. A process as claimed in claim 1 wherein the molar ratio of the total polycarboxylic acid component (I) including (I') to dicyclopentadiene (III) reacted in the first stage is from 5:1 to 1:1.3.

3. A process as claimed in claim 1 wherein the molar ratio of polyhydric alcohols (II) to polycarboxylic acid component (I) including (I') reacted in the first stage is from 0.3:1 to 5:1.

4. A process as claimed in claim 1 wherein the first stage is effected at a temperature in the range from 120° to 160° C and the second stage is effected at a temperature in the range from 180° to 250° C.

5. A process as claimed in claim 1 wherein unreacted dicyclopentadiene (III) from the first stage and/or its splitting product cyclopentadiene is additionally reacted in the second stage.

6. A process as claimed in claim 1 wherein at least one further carboxylic acid component selected from the group consisting of aromatic mono- and dicarboxylic acids, saturated and unsaturated aliphatic dicarboxylic acids and anhydrides thereof is additionally reacted in the second stage in an amount of from 3 to 15% by weight of the final reaction product.

7. A monocarboxylic acid modified alkyd resin which is capable of air-drying in the absence of a peroxide formed in an at least two step process comprising forming a reaction product in a first step A by reacting only
   (I) at least one α,β-olefinically unsaturated dicarboxylic acid component or a mixture thereof with (I')

a polycarboxylic acid component being free from polymerisable olefinic and acetylenic bonds, the mol percent of (I) being up to 50% of (I) + (I'),
(II) at least one trihydric alcohol or a mixture thereof with a minor amount of a dihydric alcohol and
(III) dicyclopentadiene at a temperature up to 160° C and subsequently in a second step B adding to the product formed in A
(IV) at least one aliphatic monocarboxylic acid component selected from the group consisting of an unsaturated fatty acid and its esters, and further esterifying and modifying A with (IV) at a temperature of at least 160° C to yield an alkyd resin containing from (1) 10 to 35% by weight of cyclopentadiene units and wherein (2) the amount by weight of the aliphatic monocarboxylic acid component added is between 20 and 60% by weight of the total reaction mixture, but at least as large as the total amount of the polycarboxylic acid component, the latter being calculated as anhydride.

8. An alkyd resin as claimed in claim 7 wherein up to 35% by weight of the chemically incorporated cyclopentadiene units are not present in the form of dicyclopentadiene units.

9. An alkyd resin as claimed in claim 7 having an acid number of less than 20.

10. An alkyd resin as claimed in claim 7 having an hydroxy number of up to 120.

11. A coating composition comprising an air-drying alkyd resin as claimed in claim 7.

* * * * *